(12) United States Patent
Bazzo et al.

(10) Patent No.: US 6,638,050 B2
(45) Date of Patent: Oct. 28, 2003

(54) INJECTOR FOR INJECTION MOULDING OF PLASTIC MATERIALS

(75) Inventors: Maurizio Bazzo, Milan (IT); Tiziano Boscariol, Milan (IT)

(73) Assignee: Amuleto - Trading E Marketing LDA, Funchal (PT)

( * ) Notice: Subject to any disclaimer, the term of this patent is extended or adjusted under 35 U.S.C. 154(b) by 44 days.

(21) Appl. No.: 09/986,430

(22) Filed: Nov. 8, 2001

(65) Prior Publication Data

US 2003/0017225 A1 Jan. 23, 2003

(30) Foreign Application Priority Data

Jul. 20, 2001 (IT) ...................................... TO2001A0711

(51) Int. Cl.$^7$ ............................................... B29C 45/77
(52) U.S. Cl. ................... 425/149; 264/40.5; 264/328.9; 425/564; 425/566
(58) Field of Search ................................ 425/562, 563, 425/564, 565, 566, 149; 264/40.5, 328.9

(56) References Cited

U.S. PATENT DOCUMENTS

| 5,472,331 A | 12/1995 | Watkins |
| 6,254,377 B1 * | 7/2001 | Kazmer et al. ............. 425/562 |
| 6,294,122 B1 * | 9/2001 | Moss et al. ............. 264/328.9 |

FOREIGN PATENT DOCUMENTS

| EP | 0 967 063 A | 12/1999 |
| JP | 08 244 086 A | 9/1995 |

* cited by examiner

*Primary Examiner*—Tim Heitbrink
(74) *Attorney, Agent, or Firm*—Sughrue Mion, PLLC

(57) ABSTRACT

Injector (1) for injection molding of plastic materials, comprising a body (2, 6) and a passage for running hot plastic material into the mold, an axially mobile pin (7) in the body (2, 6) for controlling said passage and a linear actuator (8) for controlling the movement of the pin (7) between an advanced closed position of said passage and a retracted open position of said passage. The injector (1) is equipped with a pressure sensor (13) detecting the pressure inside the mold, which is operative associated to said pin (7).

3 Claims, 1 Drawing Sheet

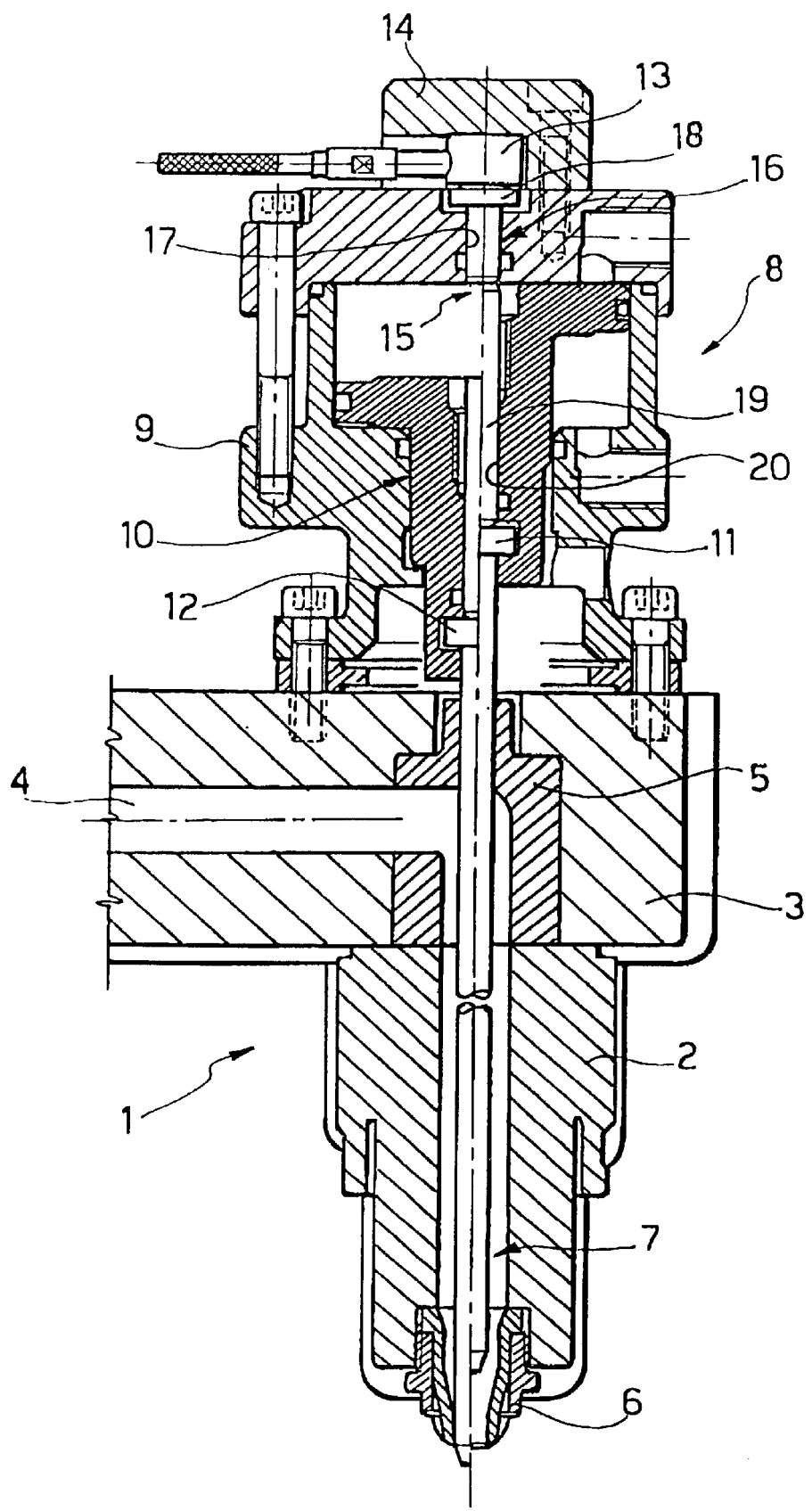

INJECTOR FOR INJECTION MOULDING OF PLASTIC MATERIALS

FIELD OF THE INVENTION

This invention relates in general to injection moulding for plastic materials and, more specifically, to an injector for injection moulding of plastic materials.

Traditionally said injectors comprise a body with a passage for running hot plastic material into the mould, a pin axially movable in the body for controlling said passage and a linear actuator for controlling displacement of the pin between an advanced closed position of said passage and a retracted open position of said passage.

In injection moulding apparatuses, a fundamental control parameter is the pressure inside the mould following injection of the plastic material. Traditionally, the pressure is directly measured in the mould, by means of specific sensors or transducers applied therein. This arrangement, in addition to not being very flexible and being relatively expensive, presents the drawback of not ensuring the required pressure measuring accuracy in all conditions.

SUMMARY OF THE INVENTION

The object of this invention is to provide a new and unique solution to overcome said drawback.

According to this invention, this object is attained by a injector for plastic material injection moulding of the type above, the primary feature of which resides in that it is provided with a sensor for measuring the pressure inside the mould which is operatively associated to said pin.

According to a preferred form of embodiment of the invention, the pressure sensor is operated by the movement of the pin to said retracted position, conveniently by means of a mobile slider arranged on the extension of said pin.

Thanks to this idea, the application of pressure sensors in the injection mould is no longer necessary. Furthermore, the arrangement according to this invention of the pressure sensor allows the application to existing injectors.

BRIEF DESCRIPTION OF THE DRAWINGS

This invention will be better explained by the following detailed descriptions with reference to the accompanying figure provided as non-limiting examples, which schematically illustrates a simplified form of an axial cross-section of the injector for plastic material injection moulding according to this invention.

DETAILED DESCRIPTION OF THE INVENTION

With reference to the figure, numeral 1 generally indicates an injector for plastic material injection moulding according to this invention, essentially consisting of a tubular body 2 applied, in the case of the illustrated embodiment, under a hot chamber 3 with a runner 4 for the plastic material melt to be injected. The runner 4 communicates with the hollow cavity in the tubular body 2 through a bushing 5 in the hot chamber 3, so to direct the flow of plastic material melt to a terminal insert 6 of the injector through which the plastic material is injected inside the mould.

The movement of the pin 7 between the advanced position and the retracted position is controlled, in a way which is generally known, by means of a linear fluid actuator 8, comprising a cylinder 9 fastened over the hot chamber 3 and a piston. 10 moving in the cylinder 9 between a lowered position, shown in the left side of the drawing with reference to the axis of the injector, corresponding to the advanced position of the pin 7, and a raised position, illustrated on the right of the drawing with reference to the axis of the injector, corresponding to the retracted position of the pin 7. The piston 10 is connected to the pin 7 by means of an enlarged head 11 of the pin, arranged on the opposite end with respect to the insert 6, in a corresponding seat 12 formed in the lower part of the piston. A certain axial play is provided between the head 11 and the seat 12.

According to a fundamental characteristic of the invention, the injector 1 is also equipped with a pressure sensor or transducer 13 of a generally conventional type, mechanically operated by the pin 7 as described below.

The pressure sensor 13 is inserted in a casing 14 applied to the tip of the cylinder 9 of the linear actuator 8 so to be on the same axis with the pin 7. The output of the pressure sensor 13 is electrically connected, in a conventional way, to the control system of the injection moulding apparatus to which the injector 1 is associated.

A mobile slider 15, consisting of an actuating rod 16 sealingly slidably through a bore 17 in the top of the cylinder 9, with an end head 18 arranged in contact with the sensitive part of the pressure sensor 13 and an opposite end facing a rod 19, is provided for operating the pressure sensor 13 by the pin 7. The rod 19 is axially interposed between the rod 16 and the end head 11 of the pin 7 and is axially slidable sealingly through a sealed cavity 20 of the piston 10.

In operation, when the pin is moved by the piston 10 of the linear actuator 8 from the advanced position to the retracted position, plastic material melt runs through the runner 4 of the hot chamber 3 and, consequently, through the hollow body 2 and the insert 6 into the mould cavity. The pressure of the plastic material injected in the mould applied to the end of the pin 7 facing the mould is translated into a force tending to push the pin upwards. This force is transmitted, via the head 11 and the rod 19, to the rod 16 which is pressed against the sensitive part of the pressure sensor 13 with a force which is proportional to the pressure inside the mould. This pressure will be indicated by the sensor 13 with the maximum accuracy.

What is claimed is:

1. An injector for injection moulding of plastic materials, comprising a body (2, 6) and a passage for running hot plastic material into a mould, a pin (7) axially movable in the body (2, 6) for controlling said passage, and a linear actuator (8) for controlling displacement of said pin (7) between an advanced closed position of said passage and a retracted open position of said passage, said injector being equipped with a pressure sensor (13) for measuring the pressure inside the mould, said pressure sensor (13) being operatively associated to said pin (7), wherein said pressure sensor (13) is axially operated by axial movement of said pin (7) to said retracted position.

2. An injector according to claim 1, further comprising a mobile slider (15) arranged on an extension of said pin (7) and operating said pressure sensor (13).

3. An injector according to claim 2, wherein said linear actuator is a fluid actuator (8) having a cylinder (9) and a hollow piston (10) sealingly movable in the cylinder (9) and coaxially connected to said pin (7), and further comprising a rod (16) operating said pressure sensor (13) and a rod (19) sealingly passing through said hollow piston (10) and axially interposed between said pin (7) and said rod (16).

* * * * *